E. N. GAILLARD.
DRESS SHIELD.
APPLICATION FILED OCT. 21, 1908.
931,591.
Patented Aug. 17, 1909.
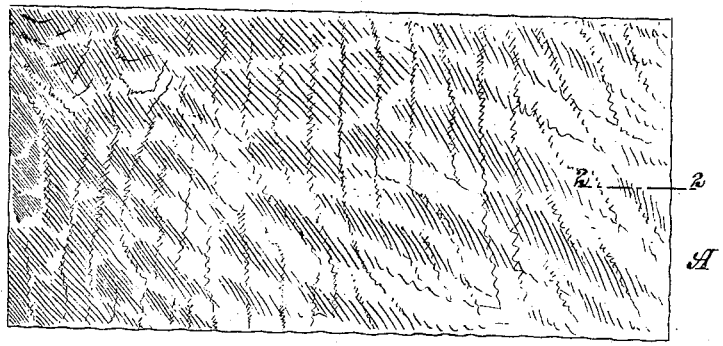
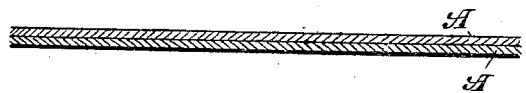
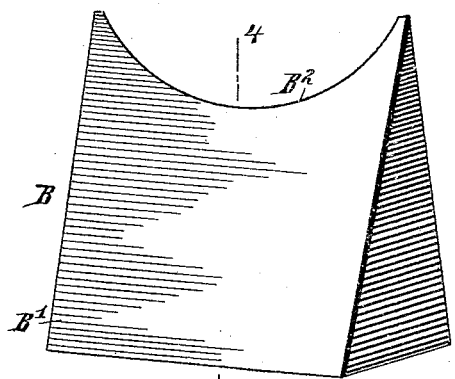
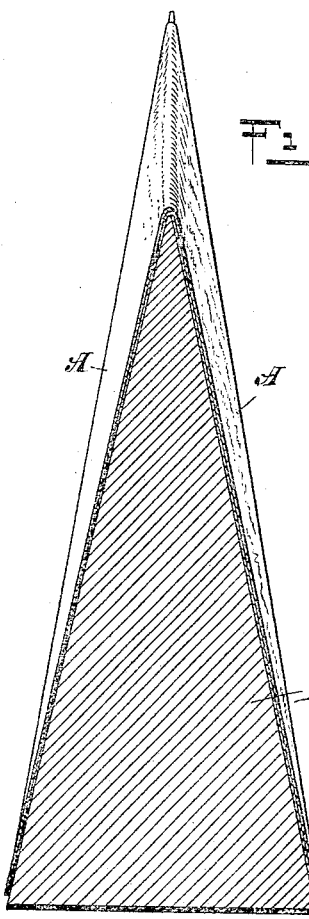
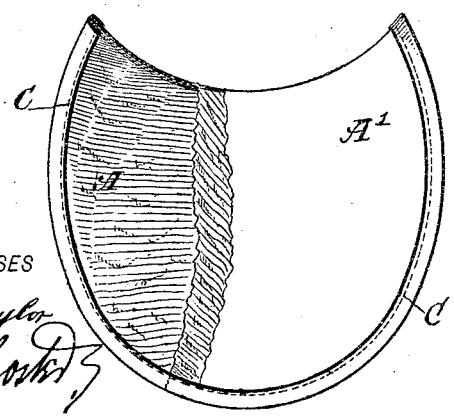
WITNESSES
INVENTOR
Ella N. Gaillard.
BY
ATTORNEYS

UNITED STATES PATENT OFFICE.

ELLA NEILSON GAILLARD, OF NEW YORK, N. Y.

DRESS-SHIELD.

No. 931,591.     Specification of Letters Patent.     Patented Aug. 17, 1909.

Application filed October 21, 1908. Serial No. 458,911.

*To all whom it may concern:*

Be it known that I, ELLA NEILSON GAILLARD, a citizen of the United States, and a resident of the city of New York, borough of Manhattan, in the county and State of New York, have invented a new and Improved Dress-Shield, of which the following is a full, clear, and exact description.

The invention relates to dress shields as shown and described in Letters Patent of the United States, No. 480,574, granted to me August 9, 1892.

The object of the present invention is to provide a new and improved dress shield which is wholly impervious to perspiration, exceedingly durable, light, soft, flexible odorless and correctly shaped, to render its use very agreeable to the wearer.

The invention consists of novel features and parts and combinations of the same which will be more fully described hereinafter and then pointed out in the claim.

A practical embodiment of the invention is represented in the accompanying drawings forming a part of this specification, in which similar characters of reference indicate corresponding parts in all the views.

Figure 1 is a face view of the material for forming the dress shield; Fig. 2 is an enlarged sectional side elevation of the same on the line 2—2 of Fig. 1; Fig. 3 is a perspective view of the mold over which the material is formed and pressed into shape; Fig. 4 is an enlarged cross section of the same on the line 4—4 of Fig. 3, the material being shown in position on the mold, and Fig. 5 is a face view of the improvement, parts being broken out.

The dress shield shown in Fig. 5 consists of an intestinal membrane A and a lining A' made of linen, cotton or like woven fabric material. The intestinal membranes used are of the undressed kind as received from the abattoir, and cut to uniform size of an approximately rectangular shape, as shown in Fig. 1, and in order to form dress shields, hat linings, skirt trimmings and other parts of wearing apparel the membranes are first washed in tepid water to clean the same of fats and other extraneous matter. Two such pieces of membrane are superimposed one on the other (see Fig. 2) while in a moist or a wet state, and firmly pressed together, to unite the membranes, thus forming a membrane of the desired strength. Now, in order to make a seamless dress shield of crescent shape, the united pieces of membrane while yet in a moist state are placed onto and fashioned over a wedge-shaped mold B (see Fig. 3), preferably of wood and having flat sides B' terminating at their upper ends in a concave ridge B². The doubled-up material is now doubled over the ridge B², to extend down over the sides B', as indicated in Fig. 4, and by pressing the material it readily assumes the concave shape of the ridge B², thus rendering it seamless along the crease, the shape of which corresponds to that of the armpit of the wearer of the dress shield. The rounded-off side and bottom portion of the membrane can be produced by cutting the material before or after fashioning the membrane on the mold B. The membrane after its removal from the mold B is coated with a waterproofing liquid, preferably applied with a brush to both sides of the membrane, and consisting of the following ingredients: soluble gun cotton, 9 parts; castor-oil, 3 parts; alcohol, 40 parts; ether, 48 parts. A solution equally as good as the above-mentioned, and which may be used, is the collodion of the *British Pharmacopœia*, and Squibb's collodion found on the market is also serviceable for the purpose. Before coating the membrane, as described, I prefer to use a muslin rag filled with vaseline and rubbed over the membrane inside and out, to grease the membrane sufficiently with a view to avoid any subsequent rattling noise when in use. The coated membrane, fashioned in the manner described, is provided either at the inner or outer sides with a covering A' of a suitable fabric material, and fastened by stitches C or the like to the membrane A along the peripheral edge thereof, as illustrated in Fig. 5.

A dress shield made in the manner described is exceedingly strong and durable, comparatively light, soft, flexible and odorless, and as it is of crescent shape and without any seam at the concave or armpit portion it is evident that the dress shield readily fits the dress and is hence very agreeable to the wearer.

Having thus described my invention, I claim as new and desire to secure by Letters Patent:

A dress shield comprising a membrane made of two superimposed and united layers of animal intestinal membrane the said united layers having a seamless crease at the middle and being of crescent shape along the crease, the said membrane having a coating of water proofing liquid on both sides of the membrane, and a covering of fabric material secured to the coated membrane.

In testimony whereof I have signed my name to this specification in the presence of two subscribing witnesses.

ELLA NEILSON GAILLARD.

Witnesses:
 THO. G. HOSTER,
 JOHN P. DAVIS.